United States Patent
Yan

(10) Patent No.: US 9,471,364 B2
(45) Date of Patent: Oct. 18, 2016

(54) VIRTUAL MACHINE SPECIFICATION ADJUSTMENT METHOD AND APPARATUS

(71) Applicant: HUAWEI TECHNOLOGIES CO., LTD., Shenzhen, Guangdong (CN)

(72) Inventor: Lijun Yan, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/743,814

(22) Filed: Jun. 18, 2015

(65) Prior Publication Data

US 2015/0286494 A1 Oct. 8, 2015

Related U.S. Application Data

(63) Continuation of application No. PCT/CN2013/079588, filed on Jul. 18, 2013.

(30) Foreign Application Priority Data

Dec. 21, 2012 (CN) .......................... 2012 1 0562447

(51) Int. Cl.
G06F 9/46 (2006.01)
G06F 9/455 (2006.01)
G06F 9/50 (2006.01)

(52) U.S. Cl.
CPC ......... *G06F 9/45558* (2013.01); *G06F 9/5077* (2013.01); *G06F 2009/4557* (2013.01)

(58) Field of Classification Search
None
See application file for complete search history.

(56) References Cited

U.S. PATENT DOCUMENTS

2008/0270674 A1 10/2008 Ginzton
2012/0124305 A1* 5/2012 Weissman ........... G06F 12/0223
711/160

FOREIGN PATENT DOCUMENTS

| CN | 101488098 A | 7/2009 |
| CN | 101593134 A | 12/2009 |
| CN | 102014159 A | 4/2011 |
| CN | 102156665 A | 8/2011 |
| CN | 102333126 A | 1/2012 |

* cited by examiner

*Primary Examiner* — Wissam Rashid
(74) *Attorney, Agent, or Firm* — Leydig, Voit & Mayer, Ltd.

(57) ABSTRACT

Embodiments of the present invention provide a virtual machine specification adjustment method and apparatus, where the virtual machine specification adjustment method includes: acquiring running status information of a virtual machine; determining, according to the running status information of the virtual machine, whether the virtual machine is a to-be-adjusted virtual machine; and if the virtual machine is a to-be-adjusted virtual machine, adjusting a specification of the to-be-adjusted virtual machine by using a resource in a reserved resource pool. By using the technical solutions of the present invention, efficiency of virtual machine specification adjustment is improved, thereby increasing a resource utilization rate of a data center. Setting of the reserved resource pool can ensure reliability of virtual machine specification adjustment, and can avoid, to some extent, a virtual machine specification adjustment failure due to insufficient resources, thereby increasing a success rate of virtual machine specification adjustment.

22 Claims, 5 Drawing Sheets

VIRTUAL MACHINE SPECIFICATION ADJUSTMENT METHOD AND APPARATUS

CROSS-REFERENCE TO RELATED APPLICATION

This application is a continuation of International Application No. PCT/CN2013/079588, filed on Jul. 18, 2013, which claims priority to Chinese Patent Application No. 201210562447.9, filed on Dec. 21, 2012, both of which are incorporated herein by reference in their entireties.

TECHNICAL FIELD

Embodiments of the present invention relate to communications technologies, and in particular, to a virtual machine specification adjustment method and apparatus.

BACKGROUND

Generally, a virtual machine is created in a data center according to some specifications such as a central processing unit (CPU) and a memory. Generally, if a busy/idle condition during running of the virtual machine changes, originally-set specifications such as a CPU and a memory need to be adjusted. For example, when a service such as a web service runs in the virtual machine, performance of the virtual machine deteriorates after a quantity of users increases, and therefore, the specifications such as a CPU and a memory need to be improved to enhance the performance of the virtual machine.

Generally, a specification of a virtual machine in a data center may be adjusted manually, and manual adjustment is manually triggered by maintenance personnel, to set again a quantity of CPUs and a memory size of the virtual machine in a management interface of the virtual machine. However, a manual adjustment method in the prior art is inefficient.

SUMMARY

Embodiments of the present invention provide a virtual machine specification adjustment method and apparatus, to improve efficiency of virtual machine specification adjustment and implement automatic virtual machine specification adjustment according to a busy/idle condition during running of a virtual machine, thereby increasing a resource utilization rate of a data center.

According to a first aspect of the present invention, a virtual machine specification adjustment method is provided, where the method includes:

acquiring running status information of a virtual machine;

determining, according to the running status information of the virtual machine, whether the virtual machine is a to-be-adjusted virtual machine; and if the virtual machine is a to-be-adjusted virtual machine, adjusting a specification of the to-be-adjusted virtual machine by using a resource in a reserved resource pool.

In a first possible implementation manner of the first aspect, the adjusting a specification of the to-be-adjusted virtual machine by using a resource in a reserved resource pool includes:

adjusting the specification of the to-be-adjusted virtual machine by using a resource in a first reserved resource pool, where the first reserved resource pool is a reserved resource pool set according to a resource specification adjustment range of the virtual machine.

According to the first aspect, in a second possible implementation manner of the first aspect, the adjusting a specification of the to-be-adjusted virtual machine by using a resource in a reserved resource pool includes:

adjusting the specification of the to-be-adjusted virtual machine by using a resource in a second reserved resource pool, where the second reserved resource pool is a reserved resource pool set according to an available resource of the virtual machine; and after the adjusting a specification of the to-be-adjusted virtual machine by using a resource in a reserved resource pool, the method further includes:

updating the resource in the second reserved resource pool according to a specification adjustment result of the virtual machine.

With reference to the first aspect or either of the first or second possible implementation manner of the first aspect, in a third possible implementation manner of the first aspect, the adjusting a specification of the to-be-adjusted virtual machine by using a resource in a reserved resource pool includes:

if it is determined that the resource in the reserved resource pool cannot meet specification adjustment requirements of at least two to-be-adjusted virtual machines, adjusting the specification of the virtual machine by using the resource in the reserved resource pool according to a sequence of applying for the resource in the reserved resource pool by the at least two to-be-adjusted virtual machines; or adjusting the specification of the virtual machine by using the resource in the reserved resource pool according to priority attributes of the at least two to-be-adjusted virtual machines.

With reference to the first aspect or any one of the first, second, or third possible implementation manner of the first aspect, in a fourth possible implementation manner of the first aspect, the running status information includes a performance indicator of the virtual machine and the specification of the virtual machine;

the determining, according to the running status information of the virtual machine, whether the virtual machine is a to-be-adjusted virtual machine includes:

determining whether the performance indicator of the virtual machine in the running status information matches the specification of the virtual machine, and if the performance indicator of the virtual machine in the running status information does not match the specification of the virtual machine, determining that the virtual machine is a to-be-adjusted virtual machine; and the adjusting a specification of the to-be-adjusted virtual machine by using a resource in a reserved resource pool includes:

determining a target specification of the virtual machine according to the performance indicator of the virtual machine; and adjusting the specification of the to-be-adjusted virtual machine to the target specification by using the resource in the reserved resource pool.

With reference to the first aspect or any one of the first, second, or third possible implementation manner of the first aspect, in a fifth possible implementation manner of the first aspect, the running status information includes a performance indicator of the virtual machine and the specification of the virtual machine;

the determining, according to the running status information of the virtual machine, whether the virtual machine is a to-be-adjusted virtual machine includes:

determining whether the performance indicator of the virtual machine in the running status information meets a target performance indicator, and if the performance indicator of the virtual machine in the running status information does not meet the target performance indicator, determining that the virtual machine is a to-be-adjusted virtual machine; and the adjusting a specification of the to-be-adjusted virtual machine by using a resource in a reserved resource pool includes:

adjusting the specification of the to-be-adjusted virtual machine by a fixed step by using the resource in the reserved resource pool until the target performance indicator is reached.

According to the fifth possible implementation manner of the first aspect, in a sixth possible implementation manner of the first aspect, before the adjusting the specification of the to-be-adjusted virtual machine by a fixed step by using the resource in the reserved resource pool, the method further includes:

determining the fixed step according to the performance indicator of the virtual machine and the target performance indicator.

With reference to the first aspect or any one of the fourth, fifth, or sixth possible implementation manner of the first aspect, in a seventh possible implementation manner of the first aspect, the performance indicator of the virtual machine includes any one or a combination of the following: a central processing unit CPU usage, a memory usage, an input/output operations per second TOPS, and an input/output delay that are of the virtual machine.

According to a second aspect of the present invention, a virtual machine specification adjustment apparatus is provided, where the apparatus includes:

an acquiring module, configured to acquire running status information of a virtual machine;

a determining module, configured to determine, according to the running status information of the virtual machine, whether the virtual machine is a to-be-adjusted virtual machine; and an adjusting module, configured to: if the determining module determines that the virtual machine is a to-be-adjusted virtual machine, adjust a specification of the to-be-adjusted virtual machine by using a resource in a reserved resource pool.

In a first possible implementation manner of the second aspect, the adjusting module is specifically configured to adjust the specification of the to-be-adjusted virtual machine by using a resource in a first reserved resource pool, where the first reserved resource pool is a reserved resource pool set according to a resource specification adjustment range of the virtual machine.

According to the second aspect, in a second possible implementation manner of the second aspect, the adjusting module is specifically configured to adjust the specification of the to-be-adjusted virtual machine by using a resource in a second reserved resource pool, where the second reserved resource pool is a reserved resource pool set according to an available resource of the virtual machine; and the apparatus further includes: an updating module, configured to: after the specification of the to-be-adjusted virtual machine is adjusted by using the resource in the reserved resource pool, update the resource in the second reserved resource pool according to a specification adjustment result of the virtual machine.

With reference to the second aspect or either of the first or second possible implementation manner of the second aspect, in a third possible implementation manner of the second aspect, the adjusting module is further configured to:

if it is determined that the resource in the reserved resource pool cannot meet specification adjustment requirements of at least two to-be-adjusted virtual machines, adjust the specification of the virtual machine by using the resource in the reserved resource pool according to a sequence of applying for the resource in the reserved resource pool by the at least two to-be-adjusted virtual machines; or adjust the specification of the virtual machine by using the resource in the reserved resource pool according to priority attributes of the at least two to-be-adjusted virtual machines.

With reference to the second aspect or any one of the first, second, or third possible implementation manner of the second aspect, in a fourth possible implementation manner of the second aspect, the running status information includes a performance indicator of the virtual machine and the specification of the virtual machine;

the determining module is specifically configured to determine whether the performance indicator of the virtual machine in the running status information matches the specification of the virtual machine, and if the performance indicator of the virtual machine in the running status information does not match the specification of the virtual machine, determine that the virtual machine is a to-be-adjusted virtual machine; and the adjusting module is specifically configured to:

determine a target specification of the virtual machine according to the performance indicator of the virtual machine; and adjust the specification of the to-be-adjusted virtual machine to the target specification by using the resource in the reserved resource pool.

With reference to the second aspect or any one of the first, second, or third possible implementation manner of the second aspect, in a fifth possible implementation manner of the second aspect, the running status information includes a performance indicator of the virtual machine and the specification of the virtual machine;

the determining module is specifically configured to determine whether the performance indicator of the virtual machine in the running status information meets a target performance indicator, and if the performance indicator of the virtual machine in the running status information does not meet the target performance indicator, determine that the virtual machine is a to-be-adjusted virtual machine; and the adjusting module is specifically configured to adjust the specification of the to-be-adjusted virtual machine by a fixed step by using the resource in the reserved resource pool until the target performance indicator is reached.

According to the fifth possible implementation manner of the second aspect, in a sixth possible implementation manner of the second aspect, the adjusting module is further configured to: before the specification of the to-be-adjusted virtual machine is adjusted by the fixed step by using the resource in the reserved resource pool, determine the fixed step according to the performance indicator of the virtual machine and the target performance indicator.

With reference to the second aspect or any one of the fourth, fifth, or sixth possible implementation manner of the second aspect, in a seventh possible implementation manner of the second aspect, the performance indicator of the virtual machine includes any one or a combination of the following: a central processing unit CPU usage, a memory usage, an input/output operations per second TOPS, and an input/output delay that are of the virtual machine.

According to the virtual machine specification adjustment method and apparatus provided in the embodiments of the present invention, first, running status information of a virtual machine is acquired; then it is determined, according to the running status information of the virtual machine, whether the virtual machine is a to-be-adjusted virtual machine; and if the virtual machine is a to-be-adjusted virtual machine, a specification of the to-be-adjusted virtual machine is adjusted by using a resource in a reserved resource pool. In this way, efficiency of virtual machine specification adjustment is improved, thereby increasing a resource utilization rate of a data center. Setting of the reserved resource pool can ensure reliability of virtual machine specification adjustment, and can avoid, to some extent, a virtual machine specification adjustment failure due to insufficient resources, thereby increasing a success rate of virtual machine specification adjustment.

BRIEF DESCRIPTION OF DRAWINGS

To describe the technical solutions in the embodiments of the present invention more clearly, the following briefly introduces the accompanying drawings required for describing the embodiments.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention.

A virtual machine specification adjustment method in the embodiments of the present invention may be executed by a virtual machine specification adjustment apparatus, where the virtual machine specification adjustment apparatus may run in a virtual machine or a physical machine in a data center.

Figure 1:
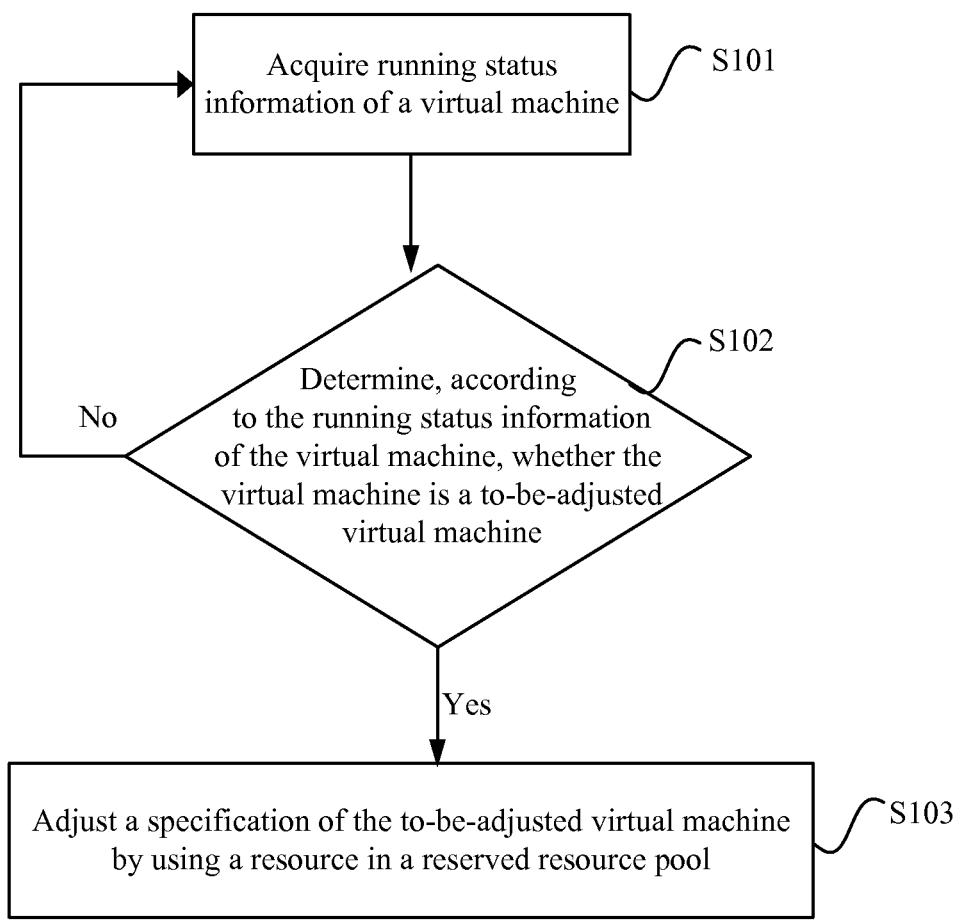
FIG. 1 is a flowchart of a virtual machine specification adjustment method according to Embodiment 1 of the present invention.

FIG. 1 is a flowchart of a virtual machine specification adjustment method according to Embodiment 1 of the present invention. As shown in FIG. 1, in this embodiment, the virtual machine specification adjustment method includes:

S101: Acquire running status information of a virtual machine.

Specifically, the running status information of the virtual machine may include a performance indicator of the virtual machine and a specification of the virtual machine. The performance indicator of the virtual machine may reflect a busy/idle condition during current running of the virtual machine, and the specification of the virtual machine may include specifications of resources used by the virtual machine, such as a CPU, a memory, a network, and a storage capacity.

Optionally, the performance indicator of the virtual machine includes any one or a combination of the following: a central processing unit (CPU) usage, a memory usage, an input/output operations per second (IOPS), and an input/output (I/O) delay that are of the virtual machine.

The performance indicator of the virtual machine and the specification of the virtual machine may be used as a basis of determining whether the specification of the virtual machine needs to be adjusted, an extent to which the specification is adjusted, and a target specification for adjustment.

S102: Determine, according to the running status information of the virtual machine, whether the virtual machine is a to-be-adjusted virtual machine; if the virtual machine is a to-be-adjusted virtual machine, perform step S103; and if the virtual machine is not a to-be-adjusted virtual machine, return to step S101, to acquire running status information of a next virtual machine.

For example, a manner of determining, according to the running status information of the virtual machine, whether the virtual machine is a to-be-adjusted virtual machine may include: determining whether the performance indicator of the virtual machine in the running status information matches the specification of the virtual machine, or determining whether the performance indicator of the virtual machine in the running status information meets a target performance indicator.

S103: Adjust the specification of the to-be-adjusted virtual machine by using a resource in a reserved resource pool.

Specifically, setting the reserved resource pool for specification adjustment of the to-be-adjusted virtual machine can ensure reliability of virtual machine specification adjustment, and can avoid, to some extent, a virtual machine specification adjustment failure due to insufficient resources. The foregoing reserved resource pool is a container from which a resource is acquired or into which a resource is released when the specification of the virtual machine is being adjusted.

According to the virtual machine specification adjustment method provided in this embodiment, first, running status information of a virtual machine is acquired; then it is determined, according to the running status information of the virtual machine, whether the virtual machine is a to-be-adjusted virtual machine; and if the virtual machine is a to-be-adjusted virtual machine, a specification of the to-be-adjusted virtual machine is adjusted by using a resource in a reserved resource pool. In this way, efficiency of virtual machine specification adjustment is improved, thereby increasing a resource utilization rate of a data center. Setting of the reserved resource pool can ensure reliability of virtual machine specification adjustment, and can avoid, to some extent, a virtual machine specification adjustment failure due to insufficient resources, thereby increasing a success rate of virtual machine specification adjustment.

In Embodiment 2 of a virtual machine specification adjustment method according to the present invention, and based on the embodiment shown in FIG. 1, step S103 may be specifically: adjusting the specification of the to-be-adjusted virtual machine by using a resource in a first reserved resource pool, where the first reserved resource pool is a reserved resource pool set according to a resource specification adjustment range of the virtual machine.

Specifically, the first reserved resource pool may be a reserved resource pool set according to the resource specification adjustment range of the virtual machine, and a specification adjustment range of resources such as a CPU, a memory, and storage capacity may be set, where the resource specification adjustment range may be set when the reserved resource pool is created, or may be set after the reserved resource pool is created. For example, if the resource specification adjustment range of the CPU, the memory, and the storage capacity of the virtual machine is set to one CPU to 10 CPUs, a 1 G memory to a 5 G memory, and 50 GB storage capacity to 200 GB storage capacity, respectively, specifications of the resources such as the CPU, the memory, and the storage capacity may be adjusted in the virtual machine according to a running busy/idle condition and within the range.

According to the virtual machine specification adjustment method provided in this embodiment, first, running status information of a virtual machine is acquired; then it is determined, according to the running status information of the virtual machine, whether the virtual machine is a to-be-adjusted virtual machine; and if the virtual machine is a to-be-adjusted virtual machine, a specification of the to-be-adjusted virtual machine is adjusted by using a resource in a first reserved resource pool. In this way, efficiency of virtual machine specification adjustment is improved, thereby increasing a resource utilization rate of a data center. Setting of the reserved resource pool can ensure reliability of virtual machine specification adjustment, and can avoid, to some extent, a virtual machine specification adjustment failure due to insufficient resources, thereby increasing a success rate of virtual machine specification adjustment.

In Embodiment 3 of a virtual machine specification adjustment method according to the present invention, and based on the embodiment shown in FIG. 1, step S103 may be specifically: adjusting the specification of the to-be-adjusted virtual machine by using a resource in a second reserved resource pool, where the second reserved resource pool is a reserved resource pool set according to an available resource of the virtual machine.

After step S103, in this embodiment, the virtual machine specification adjustment method further includes:

updating the resource in the second reserved resource pool according to a specification adjustment result of the virtual machine.

Specifically, the second reserved resource pool may be a reserved resource pool set according to the available resource of the virtual machine, where the available resource of the virtual machine includes a total reserved resource specified in a cluster, a host, or a data center to which the virtual machine belongs, and the second reserved resource pool may be a reserved resource pool obtained by specifying a specification of the total reserved resource in the cluster, the host, or the data center in which the virtual machine is located. For example, a specification of the reserved resource pool is specified as 10 CPUs, a 20 G memory, and 1 TB storage capacity; when three CPUs and a 2 G memory need to be added to a virtual machine, a capacity of the reserved resource pool decreases by three CPUs and a 2 G memory, and when one CPU and a 1 G memory need to be reduced from a virtual machine, the capacity of the reserved resource pool increases by one CPU and a 1 G memory. Therefore, if the specification of the to-be-adjusted virtual machine is adjusted by using the resource in the second reserved resource pool, after the specification of the virtual machine is adjusted, the resource in the second reserved resource pool further needs to be updated according to the specification adjustment result of the virtual machine.

According to the virtual machine specification adjustment method provided in this embodiment, first, running status information of a virtual machine is acquired; then it is determined, according to the running status information of the virtual machine, whether the virtual machine is a to-be-adjusted virtual machine; and if the virtual machine is a to-be-adjusted virtual machine, a specification of the to-be-adjusted virtual machine is adjusted by using a resource in a second reserved resource pool, and after the adjusting, the resource in the second reserved resource pool is updated according to a specification adjustment result of the virtual machine. In this way, efficiency of virtual machine specification adjustment is improved, thereby increasing a resource utilization rate of a data center. Setting of the reserved resource pool can ensure reliability of virtual machine specification adjustment, and can avoid, to some extent, a virtual machine specification adjustment failure due to insufficient resources, thereby increasing a success rate of virtual machine specification adjustment.

Figure 2:
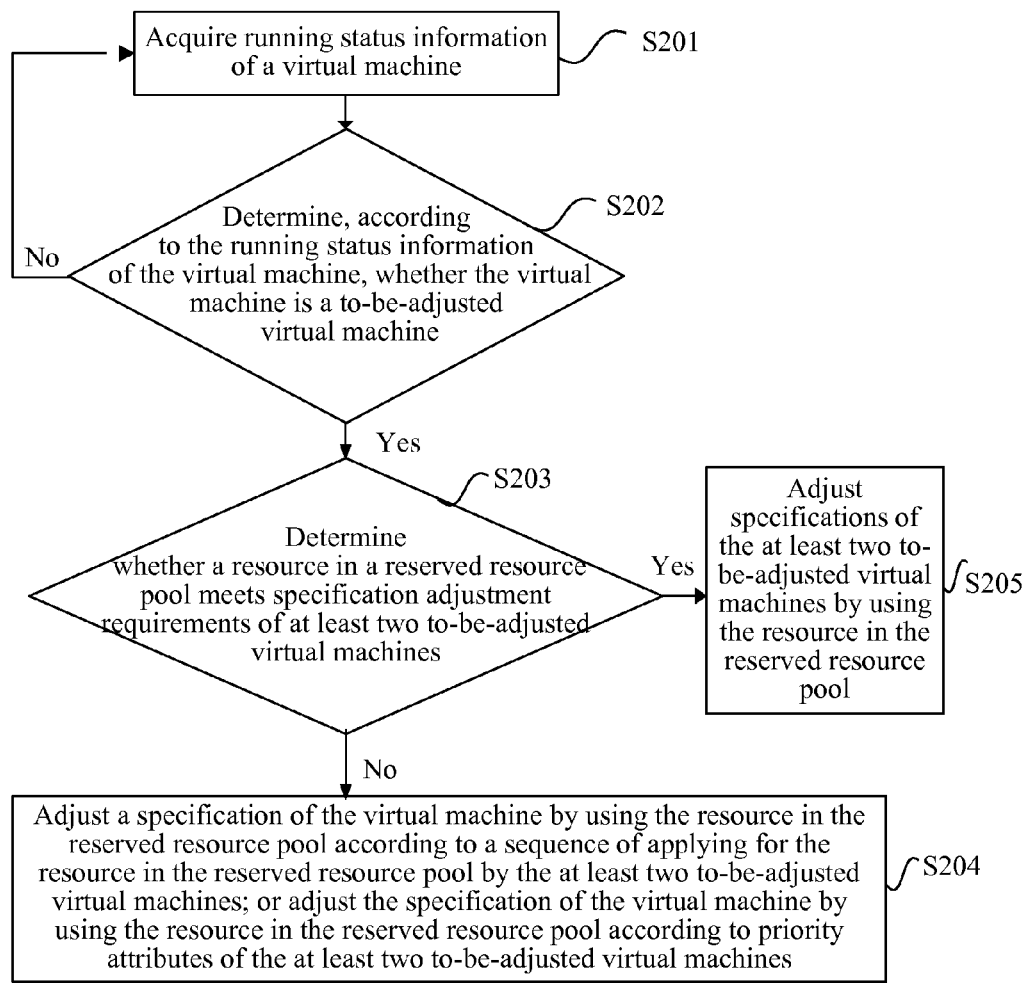
FIG. 2 is a flowchart of a virtual machine specification adjustment method according to Embodiment 4 of the present invention.

FIG. 2 is a flowchart of a virtual machine specification adjustment method according to Embodiment 4 of the present invention. As shown in FIG. 2, steps S201 and S202 of the virtual machine specification adjustment method in this embodiment are the same as steps S101 and S102 in the embodiment shown in FIG. 1, and based on the foregoing embodiment, the method may include:

S201: Acquire running status information of a virtual machine.

S202: Determine, according to the running status information of the virtual machine, whether the virtual machine is a to-be-adjusted virtual machine; if the virtual machine is a to-be-adjusted virtual machine, perform step S203; and if the virtual machine is not a to-be-adjusted virtual machine, return to step S201, to acquire running status information of a next virtual machine.

S203: Determine whether a resource in a reserved resource pool meets specification adjustment requirements of at least two to-be-adjusted virtual machines; if the resource in the reserved resource pool does not meet specification adjustment requirements of at least two to-be-adjusted virtual machines, perform step S204; and if the resource in the reserved resource pool meets specification adjustment requirements of at least two to-be-adjusted virtual machines, perform step S205.

If specifications of multiple to-be-adjusted virtual machines in a system need to be improved, the resource in the reserved resource pool may be insufficient to meet specification improvement requirements of all to-be-adjusted virtual machines.

S204: Adjust the specification of the virtual machine by using the resource in the reserved resource pool according to a sequence of applying for the resource in the reserved resource pool by the at least two to-be-adjusted virtual machines, or adjust the specification of the virtual machine by using the resource in the reserved resource pool according to priority attributes of the at least two to-be-adjusted virtual machines.

S205: Adjust specifications of the at least two to-be-adjusted virtual machines by using the resource in the reserved resource pool.

Specifically, if it is determined that the resource in the reserved resource pool is insufficient to meet the specification improvement requirements of all the to-be-adjusted virtual machines, virtual machine specification adjustment needs to be performed by using an adjustment resource preemption policy. One adjustment resource preemption policy may be: adjusting the specification of the virtual machine by using the resource in the reserved resource pool according to the sequence of applying for the resource in the reserved resource pool by the at least two to-be-adjusted virtual machines, and the other adjustment resource preemption policy may be: adjusting the specification of the virtual machine by using the resource in the reserved resource pool according to the priority attributes of the at least two to-be-adjusted virtual machines. Among multiple virtual machines that apply for specification improvement, a virtual machine with a high priority is selected for specification adjustment. In a priority configuration interface of virtual machine specification adjustment, an administrator may configure a priority of specification adjustment for a virtual machine in the system according to importance of the virtual machine. For example, levels such as high, medium, and low may be configured. Alternatively, priorities of virtual machine specification adjustment are represented by different integer values. A priority attribute of a virtual machine may be used as one type of attribute of the virtual machine and stored in a virtual machine specification adjustment apparatus in an Extensible Markup Language (XML) or another file format.

According to the virtual machine specification adjustment method provided in this embodiment, first, running status information of a virtual machine is acquired; then it is determined, according to the running status information of the virtual machine, whether the virtual machine is a to-be-adjusted virtual machine; and if the virtual machine is a to-be-adjusted virtual machine, if a resource in a reserved resource pool is insufficient to meet specification improvement requirements of all to-be-adjusted virtual machines, virtual machine specification adjustment is performed by using an adjustment resource preemption policy. In this way, efficiency of virtual machine specification adjustment is improved, thereby increasing a resource utilization rate of a data center. Setting of the reserved resource pool can ensure reliability of virtual machine specification adjustment, and can avoid, to some extent, a virtual machine specification adjustment failure due to insufficient resources, thereby increasing a success rate of virtual machine specification adjustment.

Figure 3:
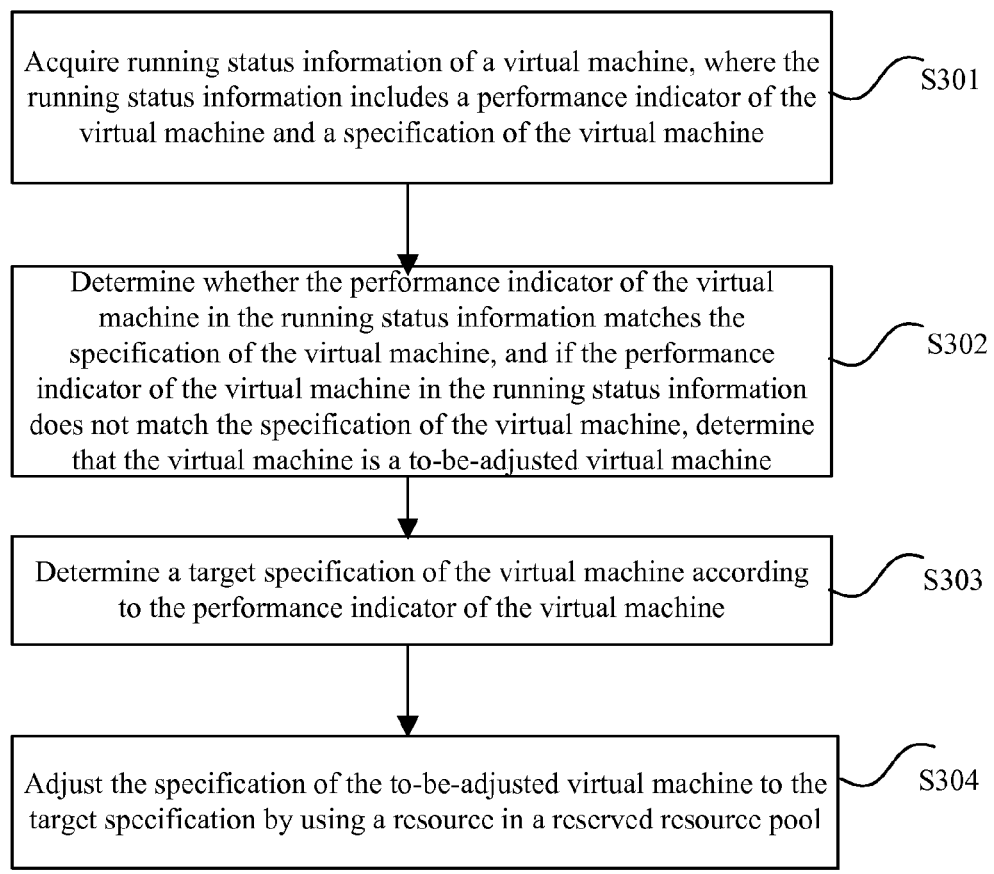
FIG. 3 is a flowchart of a virtual machine specification adjustment method according to Embodiment 5 of the present invention.

FIG. 3 is a flowchart of a virtual machine specification adjustment method according to Embodiment 5 of the present invention. As shown in FIG. 3, step S301 of the virtual machine specification adjustment method in this embodiment is the same as step S101 in the embodiment shown in FIG. 1. Based on the foregoing embodiment, the method may include:

S301: Acquire running status information of a virtual machine, where the running status information includes a performance indicator of the virtual machine and a specification of the virtual machine.

The performance indicator of the virtual machine may include any one or a combination of the following: a CPU usage, a memory usage, an IOPS, and an I/O delay that are of the virtual machine.

S302: Determine whether the performance indicator of the virtual machine in the running status information matches the specification of the virtual machine, and if the performance indicator of the virtual machine in the running status information does not match the specification of the virtual machine, determine that the virtual machine is a to-be-adjusted virtual machine.

Specifically, a manner of determining, according to the running status information of the virtual machine, whether the virtual machine is a to-be-adjusted virtual machine may be: determining whether the performance indicator of the virtual machine in the running status information matches the specification of the virtual machine, and if the performance indicator of the virtual machine in the running status information does not match the specification of the virtual machine, determining that the virtual machine is a to-be-adjusted virtual machine. A matching relationship between the performance indicator of the virtual machine and the specification of the virtual machine is that, for example, a CPU usage is 40% to 50% and a quantity of CPUs is 1; and the CPU usage is 70% to 80% and the quantity of CPUs is 2. If before adjusting, the CPU usage of the virtual machine is 70% and the quantity of CPUs is 1, the virtual machine is a to-be-adjusted virtual machine. A change of the performance indicator of the virtual machine under different service pressure may be tested by using analog service pressure, the specification of the virtual machine is adjusted, and the matching relationship between the performance indicator of the virtual machine and the specification of the virtual machine is summarized according to a test result, to determine whether the virtual machine is a to-be-adjusted virtual machine.

S303: Determine a target specification of the virtual machine according to the performance indicator of the virtual machine.

Specifically, the target specification of the virtual machine is determined according to the performance indicator of the virtual machine and a preset matching relationship between the performance indicator of the virtual machine and the specification of the virtual machine. For example, before adjusting, the CPU usage of the virtual machine is 70% and the quantity of CPUs is 1, it is determined, according to a matching relationship in which the CPU usage is 70% to 80% and the quantity of CPUs is 2, that the target specification of the virtual machine is that the quantity of CPUs is 2.

S304: Adjust the specification of the to-be-adjusted virtual machine to the target specification by using a resource in a reserved resource pool.

The quantity of CPUs of the foregoing virtual machine is adjusted to 2 by using a resource in a first reserved resource pool or a resource in a second reserved resource pool.

An adjusted performance indicator of the virtual machine matches the specification of the virtual machine, which can meet a requirement of normally using the virtual machine.

According to the virtual machine specification adjustment method provided in this embodiment, first, running status information of a virtual machine is acquired; then it is determined, according to the running status information of the virtual machine, whether a performance indicator of the virtual machine in the running status information matches a specification of the virtual machine, and if the performance indicator of the virtual machine in the running status information does not match the specification of the virtual machine, it is determined that the virtual machine is a to-be-adjusted virtual machine; and if the virtual machine is a to-be-adjusted virtual machine, first, a target specification of the virtual machine is determined according to the performance indicator of the virtual machine, and then the specification of the to-be-adjusted virtual machine is adjusted to the target specification by using a resource in a reserved resource pool. In this way, efficiency of virtual machine specification adjustment is improved, thereby increasing a resource utilization rate of a data center. Setting of the reserved resource pool can ensure reliability of virtual machine specification adjustment, and can avoid, to some extent, a virtual machine specification adjustment failure due to insufficient resources, thereby increasing a success rate of virtual machine specification adjustment.

Figure 4:
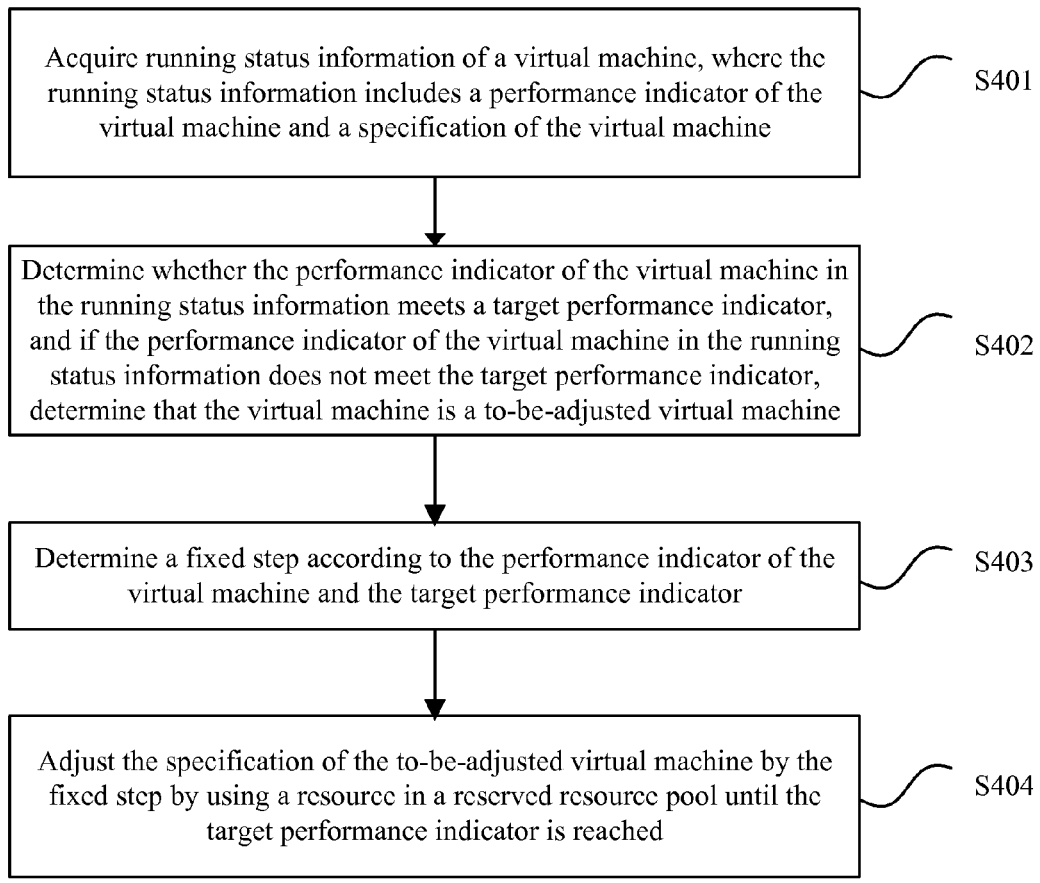
FIG. 4 is a flowchart of a virtual machine specification adjustment method according to Embodiment 6 of the present invention.

FIG. 4 is a flowchart of a virtual machine specification adjustment method according to Embodiment 6 of the present invention. As shown in FIG. 4, step S401 of the virtual machine specification adjustment method in this embodiment is the same as step S101 in the embodiment shown in FIG. 1. Based on the foregoing embodiment, the method may include:

S401: Acquire running status information of a virtual machine, where the running status information includes a performance indicator of the virtual machine and a specification of the virtual machine.

The performance indicator of the virtual machine may include any one or a combination of the following: a CPU usage, a memory usage, an IOPS, and an I/O delay that are of the virtual machine.

S402: Determine whether the performance indicator of the virtual machine in the running status information meets a target performance indicator, and if the performance indicator of the virtual machine in the running status information does not meet the target performance indicator, determine that the virtual machine is a to-be-adjusted virtual machine.

Specifically, a manner of determining, according to the running status information of the virtual machine, whether the virtual machine is a to-be-adjusted virtual machine may be: determining whether the performance indicator of the virtual machine in the running status information meets the target performance indicator, and if the performance indicator of the virtual machine in the running status information does not meet the target performance indicator, determining that the virtual machine is a to-be-adjusted virtual machine. The target performance indicator is a preset indicator value that can meet a requirement of normally running the virtual machine, and may be an empirical value. For example, the CPU usage needs to be set to be less than 60%, and if before adjusting, the CPU usage of the virtual machine is 80%, the virtual machine is a to-be-adjusted virtual machine; or the I/O delay may be set to be less than 10 ms, and if before adjusting, the I/O delay of the virtual machine is greater than 10 ms, the virtual machine is a to-be-adjusted virtual machine.

S403: Determine a fixed step according to the performance indicator of the virtual machine and the target performance indicator.

The fixed step of specification adjustment is determined according to the performance indicator of the virtual machine and the target performance indicator, where the fixed step of specification adjustment may be that, for example, one CPU is adjusted each time. It may be understood that, if there is a large difference between the performance indicator of the virtual machine and the target performance indicator, it may be determined that the fixed step is that two CPUs are adjusted each time.

S404: Adjust the specification of the to-be-adjusted virtual machine by the fixed step by using a resource in a reserved resource pool until the target performance indicator is reached.

For example, if before adjusting, the CPU usage of the virtual machine is 80%, and the target performance indicator is that the CPU usage needs to be less than 60%, a quantity of CPUs is gradually increased by the fixed step until the CPU usage is less than 60%.

An adjusted performance indicator of the virtual machine is the target performance indicator, which can meet a requirement of normally using the virtual machine.

According to the virtual machine specification adjustment method provided in this embodiment, first, running status information of a virtual machine is acquired; then it is determined, according to the running status information of the virtual machine, whether a performance indicator of the virtual machine in the running status information meets a target performance indicator, and if the performance indicator of the virtual machine in the running status information does not meet the target performance indicator, it is determined that the virtual machine is a to-be-adjusted virtual machine; and if the virtual machine is a to-be-adjusted virtual machine, first, a fixed step is determined according to the performance indicator of the virtual machine and the target performance indicator, and then a specification of the to-be-adjusted virtual machine is adjusted by the fixed step by using a resource in a reserved resource pool until the target performance indicator is reached. In this way, efficiency of virtual machine specification adjustment is improved, thereby increasing a resource utilization rate of a data center. Setting of the reserved resource pool can ensure reliability of virtual machine specification adjustment, and can avoid, to some extent, a virtual machine specification adjustment failure due to insufficient resources, thereby increasing a success rate of virtual machine specification adjustment.

Figure 5:
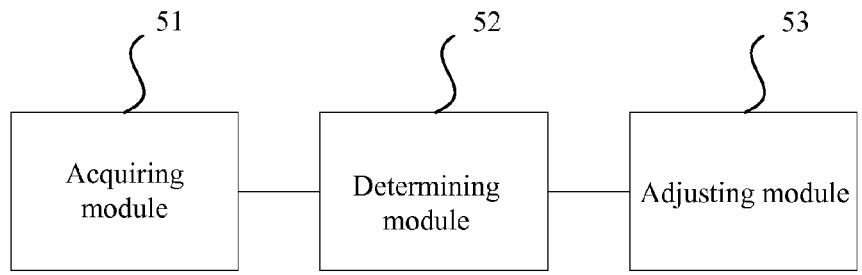
FIG. 5 is a schematic structural diagram of a virtual machine specification adjustment apparatus according to Embodiment 1 of the present invention.

FIG. 5 is a schematic structural diagram of a virtual machine specification adjustment apparatus according to Embodiment 1 of the present invention. As shown in FIG. 5, in this embodiment, the virtual machine specification adjustment apparatus includes: an acquiring module 51, a determining module 52, and an adjusting module 53, where the acquiring module 51 is configured to acquire running status information of a virtual machine; the determining module 52 is configured to determine, according to the running status information of the virtual machine, whether the virtual machine is a to-be-adjusted virtual machine; and the adjusting module 53 is configured to: if the determining module 52 determines that the virtual machine is a to-be-adjusted virtual machine, adjust a specification of the to-be-adjusted virtual machine by using a resource in a reserved resource pool.

The apparatus in this embodiment may be used to implement the technical solution in the method embodiment shown in FIG. 1, and implementation principles and technical effects are similar and are not described herein again.

Further, based on the embodiment shown in FIG. 5, and in Embodiment 2 of a virtual machine specification adjustment apparatus according to the present invention, the adjusting module 53 may be specifically configured to adjust the specification of the to-be-adjusted virtual machine by using a resource in a first reserved resource pool, where the first reserved resource pool is a reserved resource pool set according to a resource specification adjustment range of the virtual machine.

The apparatus in this embodiment may be used to implement the technical solution in the method Embodiment 2, and implementation principles and technical effects are similar and are not described herein again.

Figure 6:
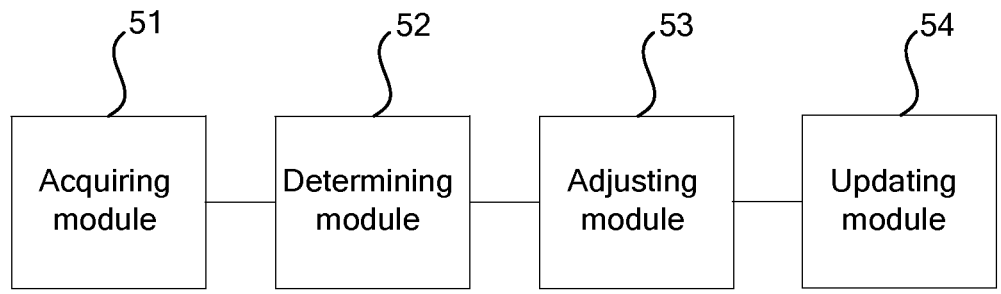
FIG. 6 is a schematic structural diagram of a virtual machine specification adjustment apparatus according to Embodiment 3 of the present invention.

FIG. 6 is a schematic structural diagram of a virtual machine specification adjustment apparatus according to Embodiment 3 of the present invention. As shown in FIG. 6, based on the embodiment shown in FIG. 5, the virtual machine specification adjustment apparatus in this embodiment further includes an updating module 54, and the adjusting module 53 is specifically configured to adjust the specification of the to-be-adjusted virtual machine by using a resource in a second reserved resource pool, where the second reserved resource pool is a reserved resource pool set according to an available resource of the virtual machine; and the updating module 54 is configured to: after the specification of the to-be-adjusted virtual machine is adjusted by using the resource in the reserved resource pool, update the resource in the second reserved resource pool according to a specification adjustment result of the virtual machine.

The apparatus in this embodiment may be used to implement the technical solution in the method Embodiment 3, and implementation principles and technical effects are similar and are not described herein again.

Furthermore, in Embodiment 4 of a virtual machine specification adjustment apparatus according to the present invention, and based on the foregoing embodiment, the adjusting module 53 may be further configured to:

if it is determined that the resource in the reserved resource pool cannot meet specification adjustment requirements of at least two to-be-adjusted virtual machines, adjust the specification of the virtual machine by using the resource in the reserved resource pool according to a sequence of applying for the resource in the reserved resource pool by the at least two to-be-adjusted virtual machines; or adjust the specification of the virtual machine by using the resource in the reserved resource pool according to priority attributes of the at least two to-be-adjusted virtual machines.

The apparatus in this embodiment may be used to implement the technical solution in the method embodiment shown in FIG. 2, and implementation principles and technical effects are similar and are not described herein again.

In Embodiment 5 of a virtual machine specification adjustment apparatus according to the present invention, and based on the foregoing embodiment, the running status information acquired by the acquiring module 51 includes a performance indicator of the virtual machine and the specification of the virtual machine.

The determining module 52 is specifically configured to determine whether the performance indicator of the virtual machine in the running status information matches the specification of the virtual machine, and if the performance indicator of the virtual machine in the running status information does not match the specification of the virtual machine, determine that the virtual machine is a to-be-adjusted virtual machine.

The adjusting module 53 is specifically configured to:

determine a target specification of the virtual machine according to the performance indicator of the virtual machine; and adjust the specification of the to-be-adjusted virtual machine to the target specification by using the resource in the reserved resource pool.

The apparatus in this embodiment may be used to implement the technical solution in the method Embodiment 5, and implementation principles and technical effects are similar and are not described herein again.

In Embodiment 6 of a virtual machine specification adjustment apparatus according to the present invention, and based on the foregoing embodiment, the running status information acquired by the acquiring module 51 includes a performance indicator of the virtual machine and the specification of the virtual machine.

The determining module 52 is specifically configured to determine whether the performance indicator of the virtual machine in the running status information meets a target performance indicator, and if the performance indicator of the virtual machine in the running status information does not meet the target performance indicator, determine that the virtual machine is a to-be-adjusted virtual machine.

The adjusting module 53 is specifically configured to adjust the specification of the to-be-adjusted virtual machine by a fixed step by using the resource in the reserved resource pool until the target performance indicator is reached.

Optionally, the adjusting module 53 is further configured to: before the specification of the to-be-adjusted virtual machine is adjusted by the fixed step by using the resource in the reserved resource pool, determine the fixed step according to the performance indicator of the virtual machine and the target performance indicator.

The apparatus in this embodiment may be used to implement the technical solution in the method Embodiment 6, and implementation principles and technical effects are similar and are not described herein again.

It should be noted that the schematic structural diagrams corresponding to the foregoing embodiments are only exemplary, and connection relationships between parts or modules are not limited to the form shown in the figure, and may be subject to a situation in an actual application.

Figure 7:
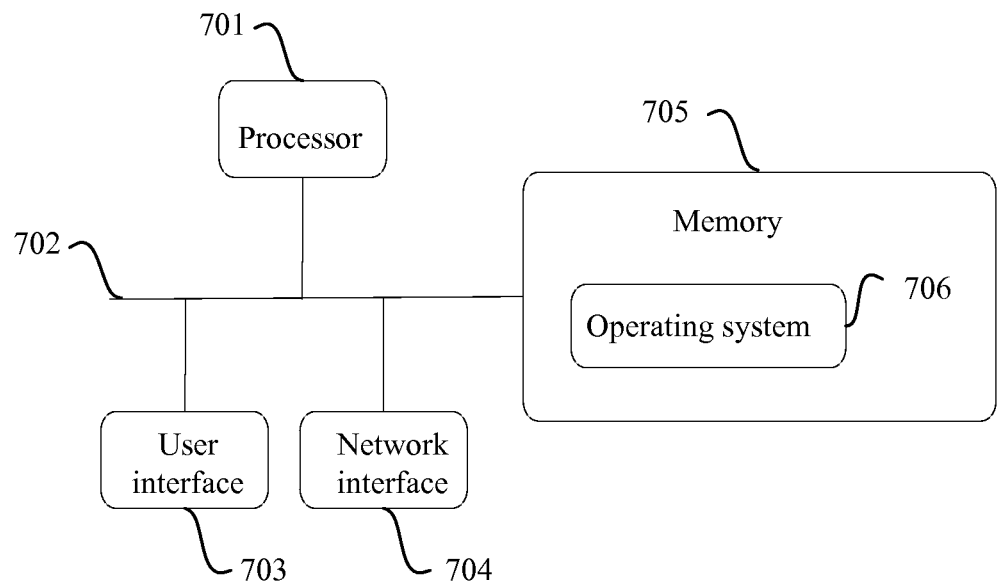
FIG. 7 is a schematic structural diagram of a virtual machine specification adjustment apparatus according to Embodiment 7 of the present invention.

FIG. 7 is a schematic structural diagram of a virtual machine specification adjustment apparatus according to Embodiment 7 of the present invention. As shown in FIG. 7, in this embodiment, the virtual machine specification adjustment apparatus includes at least one processor 701, at least one network interface 704 or another user interface 703, a memory 705, and at least one communications bus 702. Optionally, the virtual machine specification adjustment apparatus includes the user interface 703, a display, a keyboard, or a click device. The memory 705 may include a high-speed RAM memory, and may further include a non-volatile memory, for example, at least one disk memory. Optionally, the memory 705 may include at least one storage apparatus far from the foregoing virtual machine specification adjustment apparatus. The memory 705 stores an execution instruction, and when the virtual machine specification adjustment apparatus runs, the processor 701 communicates with the memory 705, and the processor 701 executes the execution instruction, so that the virtual machine specification adjustment apparatus can implement the foregoing method embodiments. An operating system 706 includes various programs, and is configured to implement various basic services and process hardware-based tasks.

The virtual machine specification adjustment apparatus provided in this embodiment of the present invention may be used to implement the technical solutions in the embodiments of the virtual machine specification adjustment method, and implementation principles and technical effects are similar and are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A virtual machine specification adjustment method implemented by a computer, comprising:
    acquiring running status information of a virtual machine;
    determining, according to the running status information of the virtual machine, whether the virtual machine is a to-be-adjusted virtual machine; and
    when the virtual machine is a to-be-adjusted virtual machine, adjusting the specification of the to-be-adjusted virtual machine using a resource in a second reserved resource pool, wherein the second reserved resource pool is a reserved resource pool set according to an available resource of the virtual machine; and
    updating a specification of the resource in the second reserved resource pool according to a specification adjustment result of the virtual machine.

2. The method according to claim 1, wherein the running status information comprises a performance indicator of the virtual machine and the specification of the virtual machine, the method further comprising:
    determining whether the performance indicator of the virtual machine in the running status information matches the specification of the virtual machine, and when the performance indicator of the virtual machine in the running status information does not match the specification of the virtual machine, determining that the virtual machine is the to-be-adjusted virtual machine.

3. The method according to claim 1, wherein the running status information comprises a performance indicator of the virtual machine and the specification of the virtual machine, the method further comprising:
    determining whether the performance indicator of the virtual machine in the running status information meets a target performance indicator, and when the performance indicator of the virtual machine in the running status information does not meet the target performance indicator, determining that the virtual machine is a to-be-adjusted virtual machine.

4. Apparatus for adjusting a virtual machine specification, comprising a processor and a memory; wherein the processor is configured to execute computer-executable instructions stored in the memory to perform operations of:
    acquiring running status information of a virtual machine;
    determining, according to the running status information of the virtual machine, whether the virtual machine is a to-be-adjusted virtual machine; and
    when the virtual machine is a to-be-adjusted virtual machine, adjusting the specification of the to-be-adjusted virtual machine using a resource in a second reserved resource pool, wherein the second reserved resource pool is a reserved resource pool set according to an available resource of the virtual machine; and
    updating a specification of the resource in the second reserved resource pool according to a specification adjustment result of the virtual machine.

5. The apparatus according to claim 4, wherein the running status information comprises a performance indicator of the virtual machine and the specification of the virtual machine, the processor is further configured to perform operations of:
    determining whether the performance indicator of the virtual machine in the running status information matches the specification of the virtual machine, and when the performance indicator of the virtual machine in the running status information does not match the specification of the virtual machine, determining that the virtual machine is the to-be-adjusted virtual machine.

6. The apparatus according to claim 4, wherein the running status information comprises a performance indicator of the virtual machine and the specification of the virtual machine, the processor is further configured to perform operations of:
    determining whether the performance indicator of the virtual machine in the running status information meets a target performance indicator, and when the performance indicator of the virtual machine in the running status information does not meet the target performance indicator, determining that the virtual machine is a to-be-adjusted virtual machine.

7. A virtual machine specification adjustment method implemented by a computer, comprising:
    acquiring running status information of a virtual machine;
    determining, according to the running status information of the virtual machine, whether the virtual machine is a to-be-adjusted virtual machine; and
    when the virtual machine is a to-be-adjusted virtual machine and the resource in the reserved resource pool cannot meet specification adjustment requirements of at least two to-be-adjusted virtual machines,
    adjusting the specification of the virtual machine using the resource in the reserved resource pool according to a sequence of applying for the resource in the reserved resource pool by the at least two to-be-adjusted virtual machines or adjusting the specification of the virtual machine using the resource in the reserved resource pool according to priority attributes of the at least two to-be-adjusted virtual machines.

8. The method according to claim 7, wherein the running status information comprises a performance indicator of the virtual machine and the specification of the virtual machine, the method further comprising:
    determining whether the performance indicator of the virtual machine in the running status information matches the specification of the virtual machine, and when the performance indicator of the virtual machine in the running status information does not match the specification of the virtual machine, determining that the virtual machine is the to-be-adjusted virtual machine.

9. The method according to claim 7, wherein the running status information comprises a performance indicator of the virtual machine and the specification of the virtual machine, the method further comprising:
    determining whether the performance indicator of the virtual machine in the running status information meets a target performance indicator, and when the performance indicator of the virtual machine in the running status information does not meet the target performance indicator, determining that the virtual machine is a to-be-adjusted virtual machine.

10. A virtual machine specification adjustment method implemented by a computer, comprising:

acquiring running status information of a virtual machine; wherein the running status information comprises a performance indicator of the virtual machine and the specification of the virtual machine;

determining whether the performance indicator of the virtual machine in the running status information matches the specification of the virtual machine, and when the performance indicator of the virtual machine in the running status information does not match the specification of the virtual machine, determining that the virtual machine is the to-be-adjusted virtual machine and adjusting the specification of the to-be-adjusted virtual machine to the target specification using the resource in a reserved resource pool.

11. The method according to claim 10, wherein the method further comprising:

adjusting the specification of the to-be-adjusted virtual machine by a fixed step using the resource in the reserved resource pool until the target performance indicator is reached.

12. The method according to claim 11, wherein the method further comprising:

determining the fixed step according to the performance indicator of the virtual machine and the target performance indicator.

13. A virtual machine specification adjustment method implemented by a computer, comprising:

acquiring running status information of a virtual machine; wherein the running status information comprises a performance indicator of the virtual machine and the specification of the virtual machine;

determining whether the performance indicator of the virtual machine in the running status information meets a target performance indicator, and when the performance indicator of the virtual machine in the running status information does not meet the target performance indicator, determining that the virtual machine is a to-be-adjusted virtual machine; and adjusting the specification of the to-be-adjusted virtual machine by a fixed step using the resource in the reserved resource pool until the target performance indicator is reached.

14. The method according to claim 13, wherein the method further comprising:

determining the fixed step according to the performance indicator of the virtual machine and the target performance indicator.

15. Apparatus for adjusting a virtual machine specification, comprising a processor and a memory; wherein the processor is configured to execute computer-executable instructions stored in the memory to perform operations of:

acquiring running status information of a virtual machine;

determining, according to the running status information of the virtual machine, whether the virtual machine is a to-be-adjusted virtual machine; and when the virtual machine is a to-be-adjusted virtual machine and the resource in the reserved resource pool cannot meet specification adjustment requirements of at least two to-be-adjusted virtual machines, adjusting the specification of the virtual machine using the resource in the reserved resource pool according to a sequence of applying for the resource in the reserved resource pool by the at least two to-be-adjusted virtual machines or adjusting the specification of the virtual machine using the resource in the reserved resource pool according to priority attributes of the at least two to-be-adjusted virtual machines.

16. The apparatus according to claim 15, wherein the running status information comprises a performance indicator of the virtual machine and the specification of the virtual machine, the processor is further configured to perform operations of:

determining whether the performance indicator of the virtual machine in the running status information matches the specification of the virtual machine, and when the performance indicator of the virtual machine in the running status information does not match the specification of the virtual machine, determining that the virtual machine is the to-be-adjusted virtual machine.

17. The apparatus according to claim 15, wherein the running status information comprises a performance indicator of the virtual machine and the specification of the virtual machine, the processor is further configured to perform operations of:

determining whether the performance indicator of the virtual machine in the running status information meets a target performance indicator, and when the performance indicator of the virtual machine in the running status information does not meet the target performance indicator, determining that the virtual machine is a to-be-adjusted virtual machine.

18. Apparatus for adjusting a virtual machine specification, comprising a processor and a memory; wherein the processor is configured to execute computer-executable instructions stored in the memory to perform operations of:

acquiring running status information of a virtual machine; wherein the running status information comprises a performance indicator of the virtual machine and the specification of the virtual machine;

determining whether the performance indicator of the virtual machine in the running status information matches the specification of the virtual machine, and when the performance indicator of the virtual machine in the running status information does not match the specification of the virtual machine, determining that the virtual machine is the to-be-adjusted virtual machine and adjusting the specification of the to-be-adjusted virtual machine to the target specification by using the resource in a reserved resource pool.

19. The apparatus according to claim 18, wherein the processor is further configured to perform operations of:

adjusting the specification of the to-be-adjusted virtual machine by a fixed step using the resource in the reserved resource pool until the target performance indicator is reached.

20. The apparatus according to claim 19, wherein the processor is further configured to perform operations of:

determining the fixed step according to the performance indicator of the virtual machine and the target performance indicator.

21. Apparatus for adjusting a virtual machine specification, comprising a processor and a memory; wherein the processor is configured to execute computer-executable instructions stored in the memory to perform operations of:

acquiring running status information of a virtual machine; wherein the running status information comprises a performance indicator of the virtual machine and the specification of the virtual machine;

determining whether the performance indicator of the virtual machine in the running status information meets a target performance indicator, and when the performance indicator of the virtual machine in the running status information does not meet the target performance indicator, determining that the virtual machine is a to-be-adjusted virtual machine; and adjusting the specification of the to-be-adjusted virtual machine by a fixed step using the resource in the reserved resource pool until the target performance indicator is reached.

22. The apparatus according to claim 21, wherein the processor is further configured to perform operations of:

determining the fixed step according to the performance indicator of the virtual machine and the target performance indicator.

\* \* \* \* \*